(12) United States Patent
Mudivarthy et al.

(10) Patent No.: US 11,978,063 B2
(45) Date of Patent: May 7, 2024

(54) ESTABLISHING OWNERSHIP OF DUAL ROUTE PROCESSORS (RPs) USING SECURE ZERO-TOUCH PROVISIONING (ZTP)

(71) Applicant: Cisco Technology, Inc., San Jose, CA (US)

(72) Inventors: Naren Mudivarthy, San Jose, CA (US); Reda Haddad, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/658,886

(22) Filed: Apr. 12, 2022

(65) Prior Publication Data

US 2023/0325848 A1 Oct. 12, 2023

(51) Int. Cl.
 *G06Q 30/018* (2023.01)
 *G06F 9/4401* (2018.01)
 *H04L 41/0806* (2022.01)

(52) U.S. Cl.
 CPC ..... *G06Q 30/0185* (2013.01); *H04L 41/0806* (2013.01); *G06F 9/4401* (2013.01)

(58) Field of Classification Search
 CPC .... G06F 9/4401; G06F 21/88; G06F 9/44505; G06F 21/44; H04L 41/0806; H04L 9/3234; H04L 41/0869; G06Q 30/0185
 See application file for complete search history.

(56) References Cited

U.S. PATENT DOCUMENTS

| | | | | |
|---|---|---|---|---|
| 9,906,493 | B1* | 2/2018 | Rodgers | H04L 63/061 |
| 10,412,191 | B1* | 9/2019 | Brandwine | G06F 9/5077 |
| 2009/0049196 | A1* | 2/2009 | Smith | H04L 63/104 |
| | | | | 709/245 |
| 2016/0246617 | A1* | 8/2016 | Watsen | H04L 63/0823 |
| 2018/0316673 | A1 | 11/2018 | Shah et al. | |
| 2020/0128392 | A1* | 4/2020 | Li | H04W 8/245 |
| 2020/0136837 | A1* | 4/2020 | Phatigaraphong | H04L 9/3268 |
| 2020/0213191 | A1* | 7/2020 | Watsen | H04L 61/5014 |

(Continued)

FOREIGN PATENT DOCUMENTS

EP 3059921 A1 * 8/2016 ......... G06F 9/44505

OTHER PUBLICATIONS

Watsen et al., Request for Comment 8572—Secure Zero Touch Provisioning (SZTP), Apr. 2019, Internet Engineering Task Force (IETF), pp. 1-87. (Year: 2019).*

(Continued)

*Primary Examiner* — Schquita D Goodwin
*Assistant Examiner* — Linh T. Nguyen
(74) *Attorney, Agent, or Firm* — Baker Botts L.L.P.

(57) ABSTRACT

According to certain embodiments, a method performed by a device comprises obtaining, from a plurality of hardware modules of the device, a plurality of serial numbers associated with the plurality of hardware modules. Each hardware module is associated with a respective serial number. The method further comprises obtaining, from a provisioning system, one or more ownership vouchers corresponding to the plurality of serial numbers. The method further comprises verifying, for each hardware module of the plurality of hardware modules, whether to trust said hardware module based at least in part on the one or more ownership vouchers.

19 Claims, 8 Drawing Sheets

(56) References Cited

U.S. PATENT DOCUMENTS

| | | | | |
|---|---|---|---|---|
| 2020/0327231 A1* | 10/2020 | Smith | ................... | G06F 21/33 |
| 2021/0409231 A1 | 12/2021 | Fedorkow et al. | | |
| 2022/0070178 A1* | 3/2022 | Lee | ................... | H04L 63/0876 |
| 2022/0237295 A1* | 7/2022 | Hu | ................... | G06F 1/3206 |
| 2023/0229778 A1* | 7/2023 | Terpstra | ................ | H04L 9/3247 |
| | | | | 713/2 |
| 2023/0325535 A1* | 10/2023 | Sharma | ................ | G06F 21/33 |
| | | | | 726/17 |
| 2023/0325849 A1* | 10/2023 | Sharma | ................ | H04L 9/30 |
| | | | | 705/318 |

OTHER PUBLICATIONS

Setting up Crosswork for Secure Zero Touch Provisioning (SZTP), XRDOCS, Fung Lim, Sep. 6, 2021.

RFC 8572, Secure Zero Touch Provisioning (SZTP), https://datatracker.ietf.org/doc/html/rfc8572.

RFC 8366, A Voucher Artifact for Bootstrapping Protocols, https://datatracker.ietf.org/doc/html/rfc8366.

\* cited by examiner

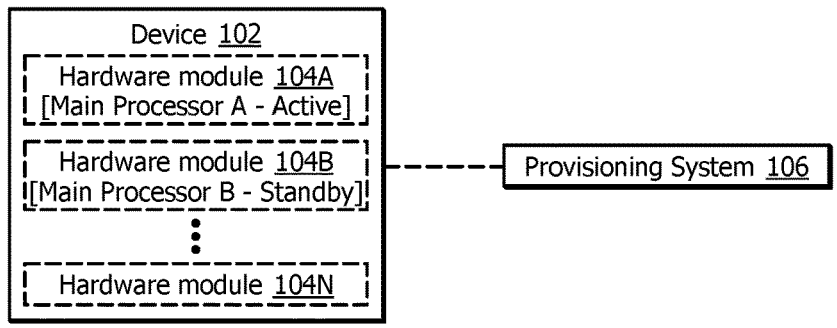

FIG. 1

```
module: ietf-voucher
    yang-data voucher-artifact:
        +-- voucher
            +-- created-on                        yang:date-and-time
            +-- expires-on?                       yang:date-and-time
            +-- assertion                         enumeration
            +-- serial-numbers                    string
            +-- idevid-issuer?                    binary
            +-- pinned-domain-cert                binary
            +-- domain-cert-revocation-checks?    boolean
            +-- nonce?                            binary
            +-- last-renewal-date?                yang:date-and-time
```

FIG. 2

```
{
    "ietf-voucher:voucher": {
        "created-on": "2016-10-07T19:31:42Z",
        "assertion": "logged",
        "serial-number": "JADA123456789,JADA1234567890"
        "idevid-issuer": "base64encodedvalue==",
        "pinned-domain-cert": "base64encodedvalue==",
        "nonce": "base64encodedvalue=="
    }
}
```

FIG. 3

```
module: ietf--sztp-bootstrap-server
   rpcs:
      +---x get-bootstrapping-data
         +---w input
         |  +---w signed-data-preferred?   empty
         |  +---w hw-model?                string
         |  +---w os-name?                 string
         |  +---w os-version?              string
         |  +---w nonce?                   binary
         +--ro output
            +--ro reporting-level?         enumeration
            +--ro conveyed-information     cms
            +--ro owner-certificate?       cms
            +--ro ownership-voucher* []    cms
```

```
+ --- x get-ownership-voucher
    + --- w input
    |   + --- w serial-number          string
    + --- ro output
        + --- ro ownership-voucher?    Cms
```

```
EN9
????????? FOC2202R293 <Active RP>
    ????????? bootstrapping-data
        ????????? conveyed-information.cms
        ????????? owner-certificate.cms
        ????????? ownership-voucher.vcj ????????? FOC2202R294 <Standby RP>
    ????????? bootstrapping-data
        ????????? conveyed-information.cms
        ????????? ownership-certificate.cms
        ????????? ownership-voucher.vcj
```

ESTABLISHING OWNERSHIP OF DUAL ROUTE PROCESSORS (RPs) USING SECURE ZERO-TOUCH PROVISIONING (ZTP)

TECHNICAL FIELD

Certain embodiments relate, in general, to establishing ownership of dual route processors (RPs) using Zero-Touch Provisioning (ZTP).

BACKGROUND

In general, ZTP may provide a technique to provision a device when the device is booting. As examples, provisioning steps may update a boot image, commit an initial configuration, and/or execute scripts to address other needs. The device may then establish connections with other systems, for example, via a network. Internet Engineering Task Force (IETF) Request for Comment (RFC) 8572 describes workflows for secure ZTP (SZTP), which provides a mechanism to provision the device, by cryptographically verifying all the artifacts (scripts and initial configs), and to establish ownership of the device.

BRIEF DESCRIPTION OF THE DRAWINGS

FIG. 1 illustrates an example of a system configured to facilitate provisioning, in accordance with certain embodiments.

FIG. 2 illustrates an example of a tree diagram representing a voucher that comprises multiple serial numbers, in accordance with certain embodiments.

FIG. 3 illustrates an example of a voucher that comprises multiple serial numbers, in accordance with certain embodiments.

DESCRIPTION OF EXAMPLE EMBODIMENTS

Overview

Figures 4, 5:
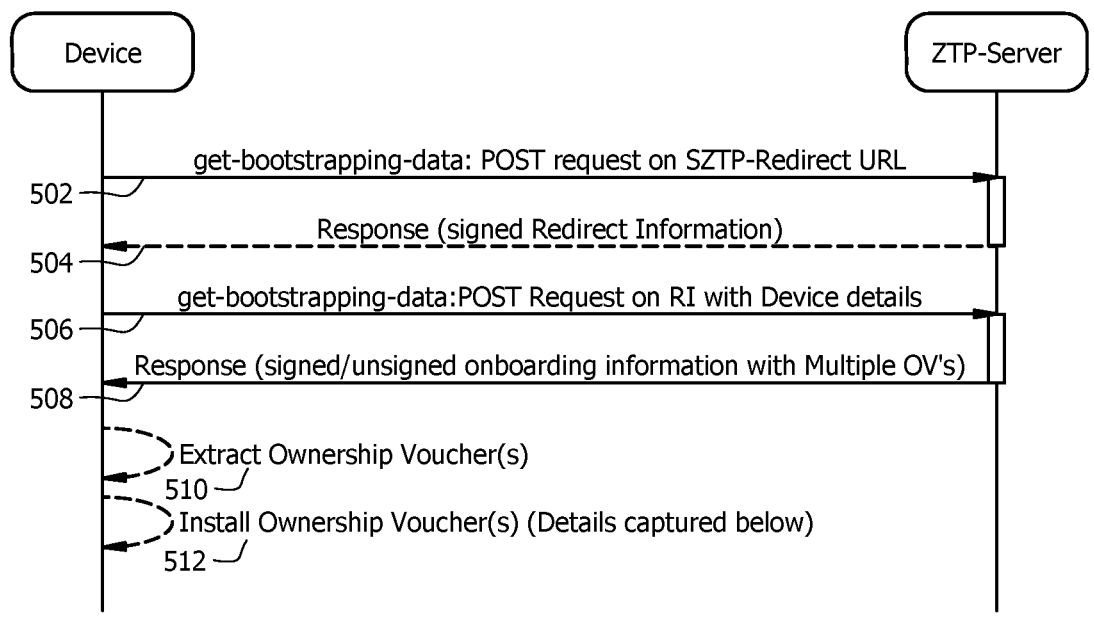
FIG. 4 illustrates an example of tree diagram that gives an overview of a bootstrapping remote procedure call that prompts a response with multiple vouchers, in accordance with certain embodiments.
FIG. 5 illustrates an example of a sequence diagram indicating interactions between a device and a ZTP server, in accordance with certain embodiments.

According to certain embodiments, a device comprises a plurality of hardware modules and one or more computer-readable non-transitory storage media comprising instructions that, when executed by processing circuitry of one or more of the hardware modules, cause the device to perform operations. The operations comprise obtaining, from the plurality of hardware modules, a plurality of serial numbers associated with the plurality of hardware modules. Each hardware module is associated with a respective serial number. The operations further comprise obtaining, from a provisioning system, one or more ownership vouchers corresponding to the plurality of serial numbers. The operations further comprise verifying, for each hardware module of the plurality of hardware modules, whether to trust said hardware module based at least in part on the one or more ownership vouchers.

According to certain embodiments, a method performed by a device comprises obtaining, from a plurality of hardware modules of the device, a plurality of serial numbers associated with the plurality of hardware modules. Each hardware module is associated with a respective serial number. The method further comprises obtaining, from a provisioning system, one or more ownership vouchers corresponding to the plurality of serial numbers. The method further comprises verifying, for each hardware module of the plurality of hardware modules, whether to trust said hardware module based at least in part on the one or more ownership vouchers.

According to yet another embodiment, one or more computer-readable non-transitory storage media may embody instructions that, when executed by a processor of a device, cause the performance of operations. The operations comprise obtaining, from a plurality of hardware modules of the device, a plurality of serial numbers associated with the plurality of hardware modules. Each hardware module is associated with a respective serial number. The operations further comprise obtaining, from a provisioning system, one or more ownership vouchers corresponding to the plurality of serial numbers. The operations further comprise verifying, for each hardware module of the plurality of hardware modules, whether to trust said hardware module based at least in part on the one or more ownership vouchers.

Technical advantages of certain embodiments of this disclosure may include one or more of the following. In certain embodiments, a ZTP procedure communicates multiple ownership vouchers (OVs) in order to establish ownership of multiple hardware modules within a device, such as active and standby processors of the device. By establishing ownership of multiple hardware modules, certain embodiments may improve security, for example, by preventing the device from using a counterfeit hardware module. Certain embodiments may facilitate efficient provisioning of a device. For example, certain embodiments establish ownership of active and standby processors during one ZTP procedure associated with bootstrapping the device, rather than requiring a customer to manually install an ownership voucher on a standby processor or to manually run the ZTP procedure for the standby processor. Certain embodiments help to ensure that a device is provisioned correctly based on the ownership established for the device, which in turn facilitates proper functioning of the device.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

A device may be provisioned using ZTP. For example, ZTP may enable a device to bootstrap itself to a Day-0 configuration provided by a network (e.g., a ZTP server) or removable storage. RFCs 8572 and 8366 describe secure ZTP workflows, which enable the device to bootstrap itself in a secure way. Typically, ZTP is only executed on an active route processor (RP) and only during the bootstrapping process. ZTP is almost never executed after that unless the user wants to upgrade to a newer version or reset the device to Day-0 provisioning.

During the bootstrapping process, the device receives three artifacts from the ZTP provisioning system (e.g., ZTP server). The three artifacts include (1) conveyed information artifact, (2) owner certificate, and (3) ownership voucher (OV). This disclosure focuses on the OV. The primary purpose of the OV is to securely establish ownership of a device with its owner. The secure ZTP provisioning workflow (RFC 8572) enables a device (e.g., network device) to establish ownership using an OV provided in response to a "get-bootstrapping-data" remote procedure call (RPC). This allows for bootstrapping the device with Day-0 provisioning after establishing the ownership. This generally works well in the case of a fixed chassis as there will be only one node (or card) with a unique Secure Unique Device Identifier (SUDI) because the OV received by the device can be used to establish ownership of that node. However, as further explained below, existing workflows such as those described by RFC 8572 and RFC 8366 may be inefficient or ineffective in other cases.

In some cases, a device may comprise multiple hardware modules. As an example, a device may include a modular chassis that allows for inserting and removing various hardware modules. The types of hardware modules included may be based on the type of device. The hardware modules may include a plurality of main processors, such as a first main processor and a second main processor of a dual-main processor device. The first main processor may be configured as active, and the second main processor may be configured as standby, or vice versa. Optionally, a device may include more than two main processors, for example, with one main processor configured as active and multiple main processors configured as standby. In general, a main processor may comprise components (e.g., processing circuitry, software, memory) configured to provide management and/or control functionality for the device. As an example, the main processor may be a route processor (RP) in the case where the device is a router or other device that includes routing capabilities. For purposes of explanation, certain examples are described below with respect to RPs, however, the examples are also applicable to other types of main processors that may be used in other types of devices. In addition to the main processors, the hardware modules inserted in the device may include other types of hardware. As an example, a router may include one or more line cards that facilitate communication via a network. Optionally, different line cards may support different communication protocols.

As indicated above, certain challenges exist with respect to existing ZTP workflows. For example, in the case of a modular chassis comprising dual-RPs, existing ZTP workflows establish ownership of an active RP by providing an OV for the active RP during the bootstrapping process. However, existing ZTP workflows cannot establish ownership of a standby RP because the OV for the standby RP is not provided during the bootstrapping process. In particular, the active RP uses its own SUDI to get its corresponding OV, but the active RP cannot use its SUDI to get the OV of another RP. This is because the SUDI is serial number-based and cannot be used to authenticate another serial number, such as the serial number of the standby RP. This leaves the system in a half-verified state where the active RP can get the OV and the standby RP cannot.

Existing solutions for establishing ownership of a standby RP are inefficient. As an example, certain solutions require a user to manually establish the ownership using a command line interface (CLI) to install the OV on the standby RP. This may be accomplished using a post-configuration script designed to execute the CLI to establish ownership of the standby RP. The script could be designed to be run by a customer associated with the OV. As another example, certain solutions secure the RPs one at a time by running secure ZTP to establish ownership of a first RP (active RP), then switching a second RP from standby to active and re-running secure ZTP on the second RP manually.

Certain embodiments of the present disclosure may provide a solution to these or other problems.

FIG. 1 illustrates an example of a system configured to facilitate provisioning, in accordance with certain embodiments. The system comprises a device 102 and a provisioning system 106. Device 102 comprises a plurality of hardware modules 104A, 104B, ... 104N. Examples of hardware modules 104 may include nodes or cards. In the example illustrated in FIG. 1, hardware module 104A illustrates a main processor configured as active and hardware module 104B illustrates a main processor configured as standby. Other hardware modules 104 may optionally include additional main processors configured as standby and/or other types of hardware modules 104 (such as line cards that facilitate communication via a network). Examples of a device 102 may include any suitable network device, such as a router, a switch, a gateway or edge, a controller, etc. In certain embodiments, such as when device 102 is a router or other device that includes routing capabilities, the main processors (e.g., hardware modules 104A and 104B) may be RPs.

Provisioning system 106 facilitates ZTP for device 102. As an example, in certain embodiments, provisioning system 106 may comprise removable storage, such as a universal serial bus (USB) drive, which may be connected to device 102 to facilitate provisioning. As another example, in certain embodiments, provisioning system 106 may comprise a ZTP server that device 102 communicates with via a network. Examples of a network may include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless.

Certain embodiments provide a zero touch approach to establishing ownership of device 102 during bootstrapping of device 102. In the case where device 102 comprises a modular chassis, certain embodiments establish ownership for each hardware module 104A and 104B that is configured as a main processor (e.g., RP). Optionally, certain embodiments may further establish ownership for other types of hardware modules 104, such as hardware module 104N, which in some embodiments may be configured as a line card that facilitates communication via a network. Certain embodiments establish ownership for all hardware modules 104 of device 102.

Establishing ownership allows device 102 to identify and report a counterfeit hardware module 104 (if any) before device 102 is onboarded into a network. As an example, a customer may purchase a device 102 from a party authorized to sell device 102 (e.g., manufacturer, reseller, distributor, etc.). The customer may then provision device 102 for use in the customer's network, such as a software defined WAN (SD-WAN) of the customer. ZTP can be used to establish that the customer's ownership of the device 102.

Embodiment 1: Ownership Establishment on Dual-RPs Using Secure ZTP Over Network

In a first set of embodiments, ownership is established on multiple hardware modules 104 (such as dual-RPs) using secure ZTP over a network. For example, in the first set of embodiments, the provisioning system 106 may comprise a ZTP server that communicates with device 102 via a network. Examples of the first set of embodiments include Options A, B, C, and D below.

Option A

Option A of the first set of embodiments includes multiple serial numbers in an OV associated with a device 102, where each serial number corresponds to a hardware module 104. Certain embodiments extend the workflows described in RFC 8366 to include multiple serial numbers in one OV. The definition of the voucher in RFC 8366 includes a field to specify the serial number of device 102. Certain embodiments of the present disclosure extend this field to include a list of serial numbers indicating multiple hardware modules 104 of device 102. As an example, the serial numbers can be listed as comma separated values. In an embodiment, the field includes a first serial number of the first hardware module 104A (e.g., the main processor configured as active) and the second hardware module 104B (e.g., the main processor configured as standby). Certain embodiments may further include serial numbers associated with other hardware modules 104, such as hardware module 104N (e.g., a line card). Certain embodiments extend the field in a manner that does not deviate from the current model defined in RFC 8366.

In certain embodiments, hardware module 104A (e.g., the main processor configured as active) communicates with hardware module 104B (e.g., the main processor configured as standby) to obtain the serial number associated with hardware module 104B. As an example, hardware module 104A and hardware module 104B may communicate using their respective SUDI certificates in order to authenticate their respective serial numbers. After hardware module 104A obtains the serial number associated with hardware module 104B, then hardware module 104A can include the serial number associated with hardware module 104B among the serial numbers that hardware module 104A provides to provisioning system 106 (e.g., ZTP server or removable storage). From the perspective of provisioning system 106, the provisioning system 106 sees a single request from hardware module 104A, and the request includes multiple serial numbers that can be authenticated through the respective SUDIs (e.g., the request includes serial numbers associated with both hardware module 104A and hardware module 104B). In certain embodiments, hardware module 104A obtains serial numbers from other hardware modules 104 (e.g., other types of hardware modules 104, such as line cards) and includes those serial numbers in the request to the provisioning system 106. Certain embodiments use SUDI certificates to obtain these serial numbers.

Examples of the first set of embodiments, Option A, are further illustrated with respect to FIG. 2 and FIG. 3. For example, FIG. 2 illustrates a tree diagram representing a high-level view of a voucher that comprises multiple serial numbers. FIG. 3 illustrates an example of a voucher that comprises multiple serial numbers. The example of FIG. 3 provides the serial numbers as comma separated values. Device 102 (e.g., via hardware module 104A) may receive the voucher from provisioning system 106 and may parse through the list of serial numbers to facilitate establishing ownership of the hardware modules 104 associated with the listed serial numbers.

Option B

Option B of the first set of embodiments accommodates the use of multiple OVs associated with device 102, where each OV corresponds to a hardware module 104. Certain embodiments extend RFC 8572 to include multiple OVs in the Response to "get-bootstrapping-data" RPC. For example, RFC 8572 defines a get-bootstrapping-data RPC that prompts a Response. Certain embodiments of the present disclosure extend the Response to accommodate multiple OVs for multiple hardware modules 104A and 104B (e.g., for both Active and Standby RPs). Optionally, certain embodiments accommodate additional OVs for other types of hardware modules 104 (such as line cards).

FIG. 4 illustrates an example of tree diagram that gives an overview of a bootstrapping remote procedure call that prompts a response with multiple vouchers, in accordance with Option B of the first set of embodiments. As an example, the tree diagram gives an overview of the bootstrapping RPC that prompts the Response with multiple OVs for multiple hardware modules 104A and 104B (e.g., for both Active and Standby RPs).

FIG. 5 illustrates an example of a sequence diagram indicating interactions between device 102 and provisioning system 106 (such as a ZTP server), in accordance with Option B of the first set of embodiments. In the examples of FIG. 5, the steps performed by device 102 may be performed using the first hardware module 104A (e.g., active RP). The example of FIG. 5 begins at step 502 with device 102 sending provisioning system 106 a "get-bootstrapping-data" RPC. In the example, the RPC includes a POST request on SZTP-Redirect URL. The sequence proceeds to step 504, where provisioning system 106 sends device 102 a Response. The Response may include signed Redirect Information (RI). The sequence proceeds to step 506, where device 102 sends provisioning system 106 a "get-bootstrapping-data" RPC. In the example, the RPC includes a POST request on RI with Device details. The sequence proceeds to step 508, where provisioning system 106 sends device 102 a Response. The Response may include signed or unsigned onboarding information with multiple OVs. The sequence proceeds to step 510 where device 102 extracts OV(s) and then to step 512 where device 102 installs the OV(s). An example of installing the OV(s) is further described below with respect to FIG. 8B.

Option C

Option C of the first set of embodiments uses a new RPC to obtain the OV for hardware module 104B (e.g., standby RP). Similarly, a new RPC may be used to obtain OVs for other types of hardware modules 104 (such as line cards).

Certain embodiments extend RFC 8572 to add a new RPC (which may be referred to as "get-ownership-voucher") to obtain the OV for one or more additional hardware modules 104 (e.g., standby RP and/or other type of hardware module 104) in order to supplement a workflow that obtains the OV for hardware module 104A (e.g., active RP).

Certain embodiments extend RFC 8572 by adding a new RPC "get-ownership-voucher" that makes an explicit request to provisioning system 106 (e.g., ZTP server) to get the OV for hardware module 104B (e.g., standby RP). In certain embodiments, device 102 sends provisioning system 106 an explicit request for the OV. For example, a first hardware module 104A (active RP) may send the request to provisioning system 106 as a proxy on behalf of another hardware module 104, such as second hardware module 104B (e.g., standby RP). Or, the second hardware module 104B (e.g., standby RP) can send the request via the first hardware module 104A (e.g., active RP). This solution may accommodate deployments for which at any point in time, only one of the RPs can talk to the network, for example, due to an Internet Protocol (IP)/Medium Access Control (MAC) movement of the management interface.

Figures 6, 7A:
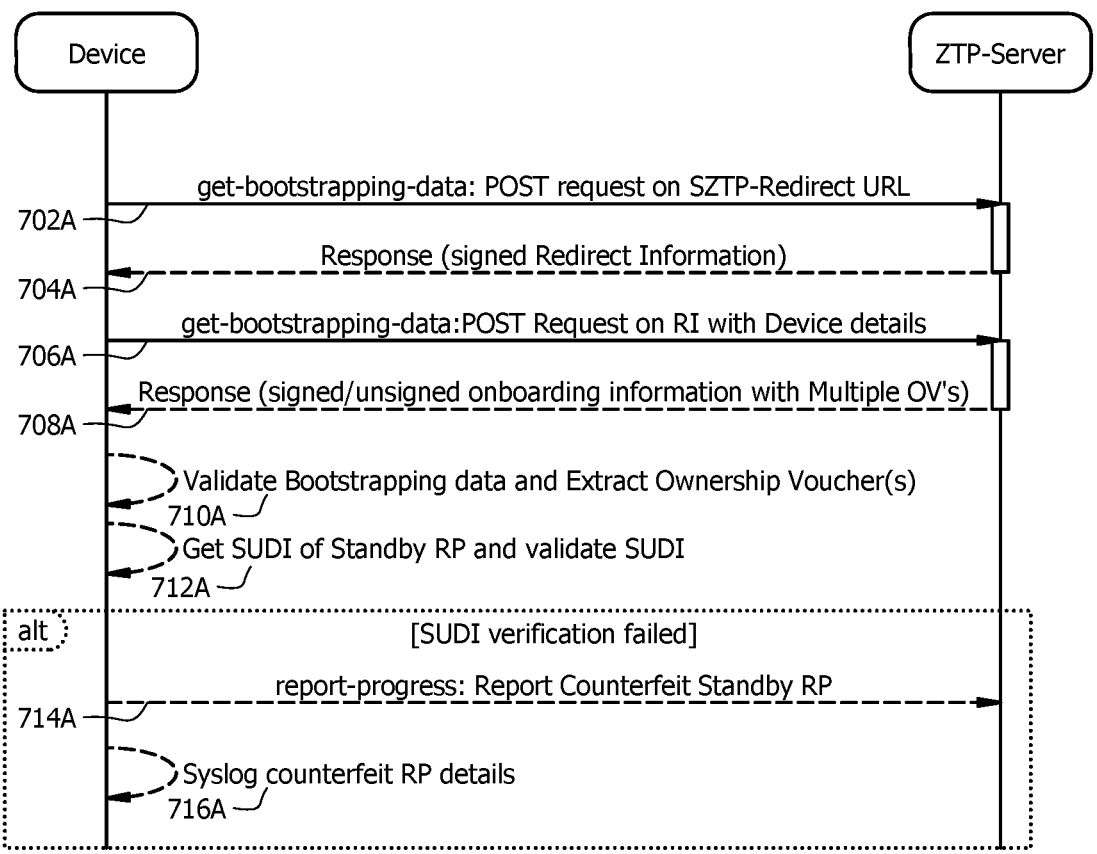
FIG. 6 illustrates an example of a remote procedure call that explicitly requests a server to obtain a voucher for a standby route processor, in accordance with certain embodiments.
FIG. 7A illustrates an example of a sequence diagram indicating interactions between a device and a ZTP server, in accordance with certain embodiments.
Figure 7B:
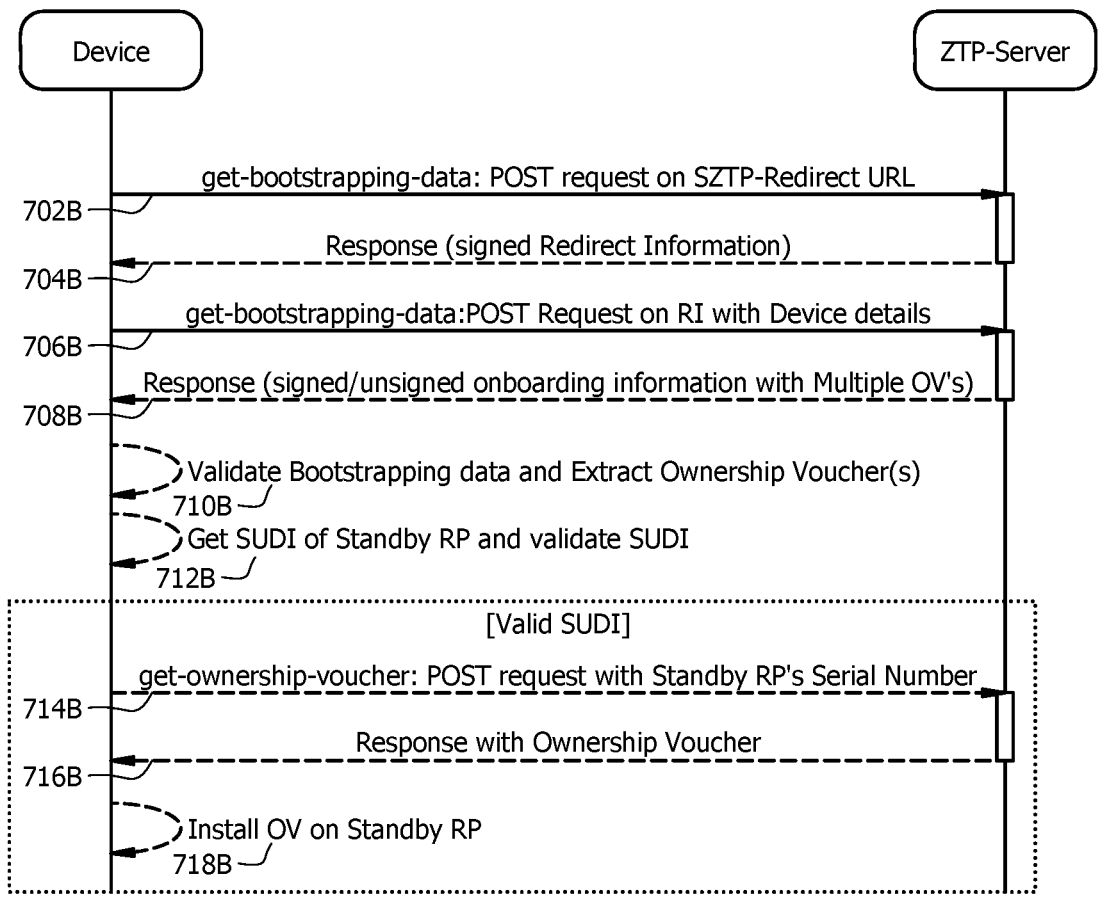
FIG. 7B illustrates an example of a sequence diagram indicating interactions between a device and a ZTP server, in accordance with certain embodiments.

Examples of the first set of embodiments, Option C, are further illustrated with respect to FIGS. 6, 7A, and 7B. FIG. 6 illustrates an example of a remote procedure call that explicitly requests a server to obtain a voucher for a standby route processor, in accordance with certain embodiments. In certain embodiments, device 102 promotes the connection between provisioning system 106 (e.g., ZTP server) and itself to a trusted state following the procedure described in Appendix B of RFC 8572. Device 102 gets the SUDI from hardware module(s) 104 for which the OV(s) is to be requested, such as the second hardware module 104B (e.g., standby RP). In the example, after validating, device 102 sends the "get-ownership-voucher" RPC to provisioning system 106 in order to receive the OV for the second hardware module 104B (e.g., standby RP). The "get-ownership-voucher" RPC indicates the serial number of the second hardware module 104B (e.g., standby RP). In the case of an invalid SUDI, the ZTP reports the second hardware module 104B as a counterfeit to provisioning system 106 (e.g., ZTP Server), an example of which is shown in FIG. 7A.

FIGS. 7A and 7B illustrate example sequence diagrams indicating interactions between a device 102 and a provisioning system 106 (e.g., ZTP server), in accordance with certain embodiments. In the examples of FIGS. 7A and 7B, the steps performed by device 102 may be performed using the first hardware module 104A (e.g., active RP).

With respect to FIG. 7A, the sequence begins at step 702A with device 102 sending provisioning system 106 a get-bootstrapping-data RPC. The RPC includes a POST request on SZTP-Redirect URL. The sequence proceeds to step 704A with provisioning system 106 sending device 102 a Response. The Response is signed with Redirect Information (RI). The sequence proceeds to step 706A with device 102 sending provisioning system 106 a get-bootstrapping-data RPC. The RPC includes a POST Request on RI with Device details. The sequence proceeds to step 708A with provisioning system 106 sending device 102 a Response. The response comprises signed or unsigned onboarding information with one or more OVs. At step 710A, device 102 validates bootstrapping data and extracts the OV(s). At step 712A, device 102 (e.g., via the active RP of device 102) obtains the SUDI of one or more hardware modules 104 to be validated, such as the SUDI of the standby RP. Device 102 performs validation of each SUDI to determine whether the SUDI is valid or invalid.

The outcome of the validation step 712A shows the case where the SUDI validation fails (invalid SUDI). The sequence proceeds to step 714A, where device 102 sends provisioning system 106 a report-progress message to report the relevant hardware module 104 (e.g., standby RP) as counterfeit. At step 716A, device 102 generates a system log that includes details associated with the counterfeit hardware module 104.

Turning to FIG. 7B, steps 702B through 712B of FIG. 7B are analogous to steps 702A through 712A of FIG. 7A. The outcome of the validation step 712B of FIG. 7B shows the case where the SUDI validation passes (valid SUDI). The sequence then proceeds to step 714B where device 102 sends provisioning system 106 a get-ownership-voucher RPC. The RPC includes a POST request with the serial number(s) of the hardware module(s) 104 validated in step 712B, such as the serial number of the standby RP. At step 716B, device 102 receives a Response from provisioning system 106. The Response comprises one or more OVs corresponding to the serial number(s) that were sent in step 714B. At step 718B, device 102 installs each of the one or more OV(s) received in step 716B on its corresponding hardware module 104, such as the standby RP. An example of installing the OV(s) is further described below with respect to FIG. 8B.

Option D

Option D includes examples of installing OVs on one or more hardware modules 104 of device 102. For example, a first hardware module 104A (active RP) may facilitate installing an OV associated with a second hardware module 104B (standby RP) on the second hardware module 104B. In certain embodiments, the first hardware module 104A may follow similar steps in order to install other OVs on other hardware modules 104 (such as line cards).

In certain embodiments, once the device 102 receives the OV(s) following any of the above-mentioned mechanisms (Option A, B, or C), ZTP will validate the SUDI of the relevant hardware module(s) 104 (e.g., standby RP) and establish ownership of the device 102 based on establishing ownership of each of the main processors (e.g., both the active RP and the standby RP) and, in some embodiments, further based on establishing ownership of other hardware module(s) 104 (such as line cards).

Figure 8A:
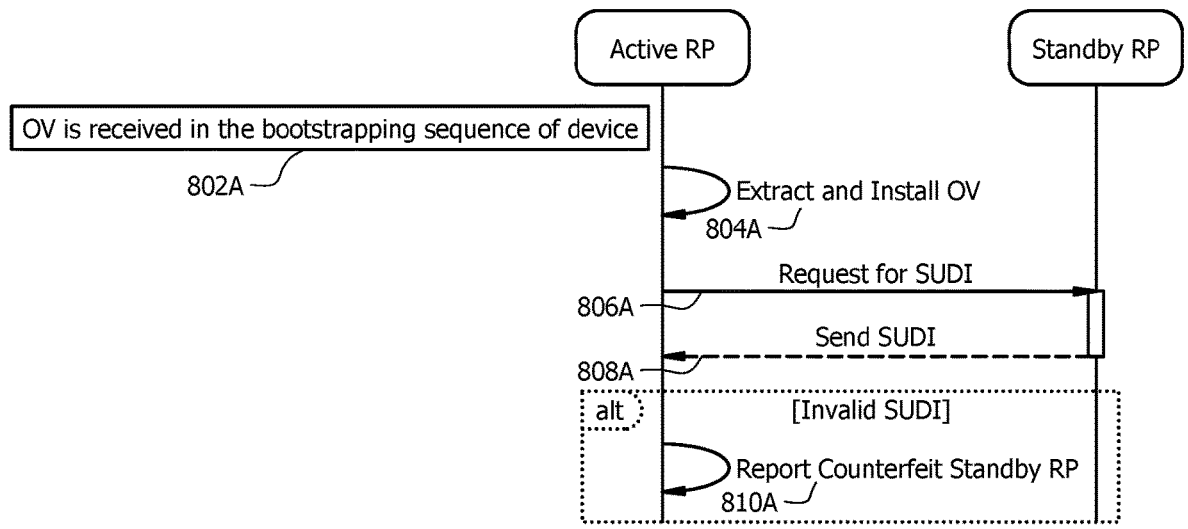
FIG. 8A illustrates an example of a sequence diagram indicating interactions between an active RP and a standby RP, in accordance with certain embodiments.

FIG. 8A illustrates an example of a sequence diagram indicating interactions between an active RP and a standby RP, in accordance with certain embodiments. At step 802A, the active RP obtains one or more OVs during the bootstrapping sequence of device 102. As examples, the OV(s) may be obtained according to Options A, B, or C of the first set of embodiments described above or according to Options A or B of the second set of embodiments described below. In certain embodiments, the active RP obtains a first OV associated with the active RP and a second OV associated with the standby RP. At step 804A, the active RP extracts and installs its OV. At step 806A, the active RP sends the standby RP a request for SUDI. At step 808A, the standby RP sends SUDI. The active RP performs validation to determine whether the SUDI is valid or invalid.

FIG. 8A illustrates the case where the active RP determines that the SUDI of the standby RP is invalid. In response, the active RP proceeds to step 810A where the active RP reports the standby RP as counterfeit. Thus, if SUDI validation of the standby RP fails, ZTP will install the OV on the active RP and will report to the network that the standby RP failed SUDI validation. As an example, the failure may be reported via a report-progress RPC of RFC 8572. Certain embodiments report the failure using a system log (Syslog) on device 102.

Figure 8B:
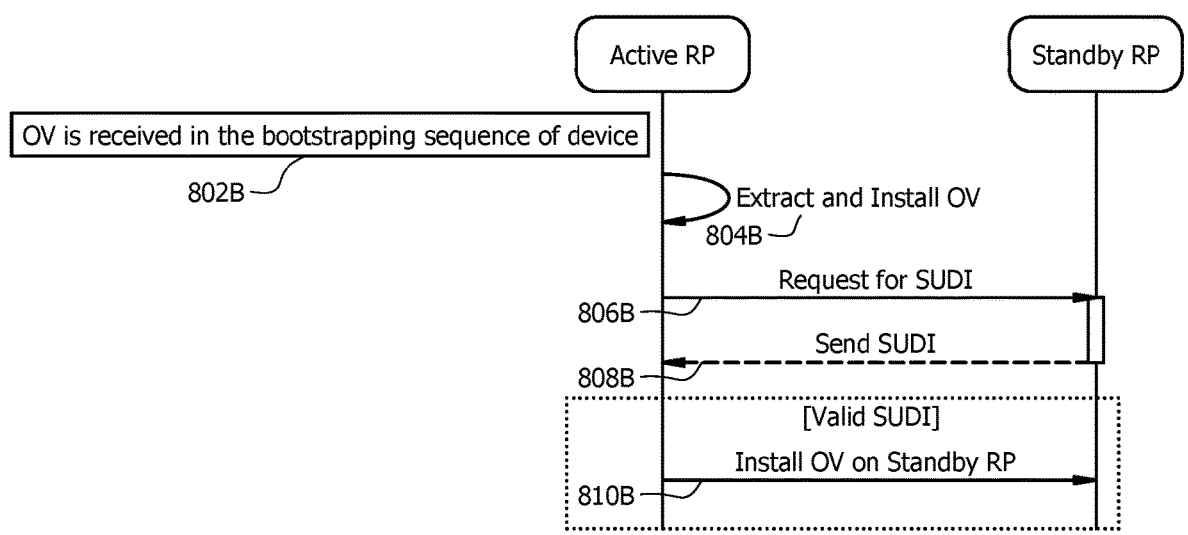
FIG. 8B illustrates an example of a sequence diagram indicating interactions between an active RP and a standby RP, in accordance with certain embodiments.

FIG. 8B illustrates an example of a sequence diagram indicating interactions between an active RP and a standby RP, in accordance with certain embodiments. Steps 802B through 808B of FIG. 8B are analogous to Steps 802A through 808A of FIG. 8A. However, FIG. 8B illustrates the case where the active RP determines that the SUDI of the standby RP is valid. Thus, the active RP proceeds to step 810B to install the standby RP's OV on the standby RP. In summary, upon successful validation of the SUDI, ZTP will install the OVs for both the active RP and the standby RP, establishing ownership of both the RPs.

Figure 9:
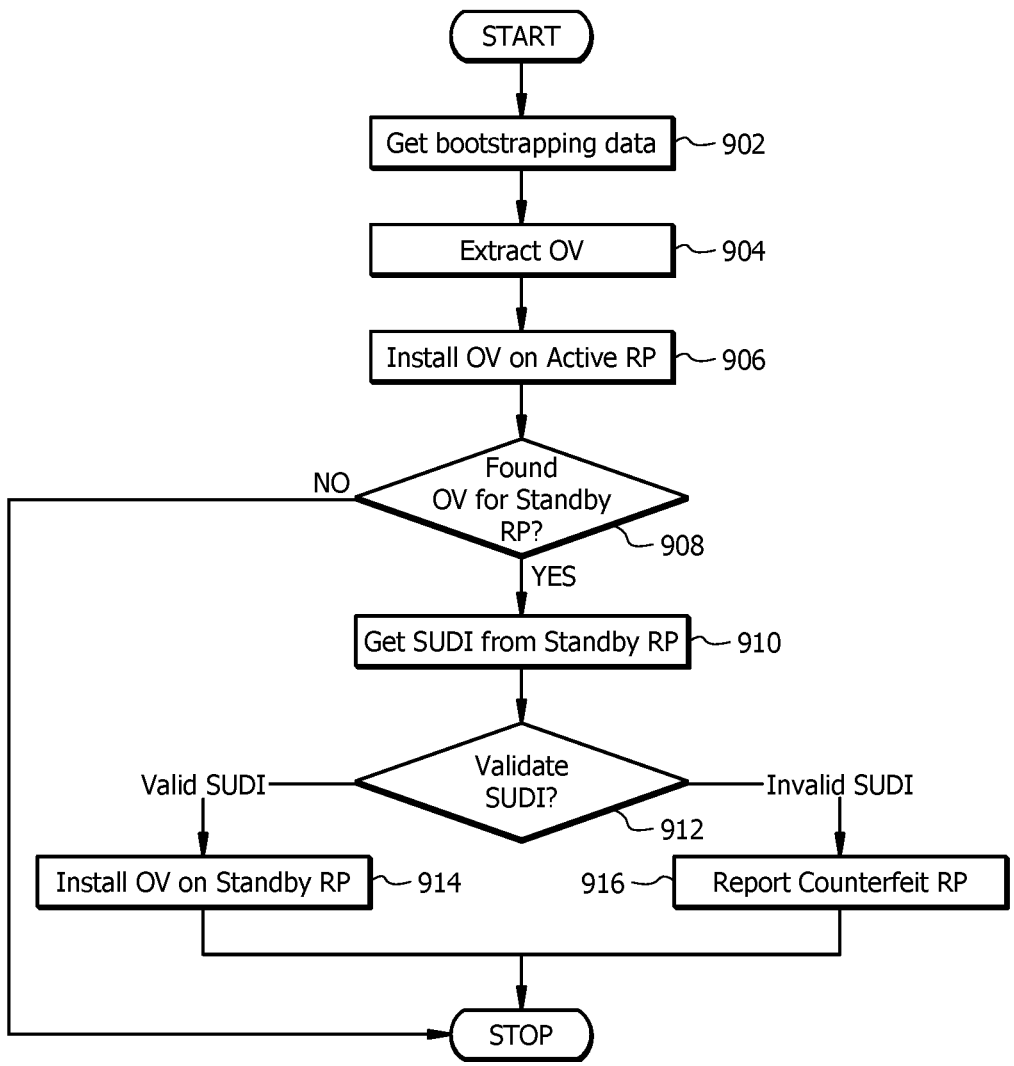
FIG. 9 illustrates an example of a flow chart showing verifications done by a provisioning system to establish ownership of a hardware module of a device, in accordance with certain embodiments.

FIG. 9 illustrates an example of a flow chart showing verifications done by a provisioning system 106 to establish ownership of a hardware module 104 of a device 102, in accordance with certain embodiments. In particular, the example of FIG. 9 illustrates the case for establishing ownership of active and standby RPs. Similar steps may be used to establish ownership of other hardware modules 104.

At step 902, device 102 obtains bootstrapping data from provisioning system 106. At step 904, device 102 extracts one or more OVs, including at least an OV associated with the active RP. At step 906, device 102 installs the OV associated with the active RP on the active RP. At step 908, device 102 determines whether an OV associated with the standby RP has been found. If no, the method ends. If yes, the method proceeds to step 910 where the active RP of device 102 obtains the standby RP's SUDI from the standby RP. At step 912, the active RP determines whether the SUDI of the standby RP is valid. If at step 912 the SUDI of the standby RP is valid, the method proceeds to step 914 with installing the OV associated with the standby RP on the standby RP. If at step 912 the SUDI of the standby RP is invalid, the method proceeds to step 916 with reporting the standby RP as counterfeit. The method then ends.

Embodiment 2: Ownership Establishment on Dual-RP Using Secure ZTP Over Removable Storage In a second set of embodiments, ownership is established on multiple hardware modules 104 (such as dual-RPs) using secure ZTP over removable storage. For example, in the second set of embodiments, the provisioning system 106 may comprise removeable storage, such as a USB drive that may be connected to device 102 to facilitate provisioning. Examples of the second of embodiments include Options A, B, and C below.

Option A

Option A of the second set of embodiments is analogous to Option A of the first set of embodiments. For example, similar steps may be used when the provisioning system 106 comprises removeable storage as when the provisioning system 106 comprises a network (e.g., ZTP server). In certain embodiments, Option A extends RFC 8366 to include multiple serial numbers in one Ownership Voucher. See Option A of the first set of embodiments for further details.

Option B

Option B of the second set of embodiments may include multiple OVs in a path. As an example, the provisioning system 106 (e.g., removable storage) includes an OV for each RP (e.g., a first OV for an active RP and a second OV for a standby RP). ZTP will involve obtaining and installing the OV of the standby RP after validating the SUDI. For example, the active RP may use the standby RP's SUDI to obtain the standby RP's serial number and may then use the serial number to obtain the standby RP's OV from a directory of the removable storage/provisioning system 106. Certain embodiments obtain OVs for multiple hardware modules 104 (e.g., active RP, standby RP, and optionally other hardware modules 104, such as line cards), each OV obtained from a corresponding directory. Each OV is used for establishing ownership of its respective hardware module 104. Certain embodiments may be based on RFC 8572 and may modify RFC 8572 to extend the contents of the removable storage to have multiple OVs in the corresponding path.

Option C

Option C of the second set of embodiments is analogous to Option D of the first set of embodiments. For example, similar steps may be used when the provisioning system 106 comprises removeable storage as when the provisioning system 106 comprises a network (e.g., ZTP server). See Option D of the first set of embodiments for a discussion of communication between an active RP and a standby RP for installing the OV on the standby RP.

Figures 10, 11:
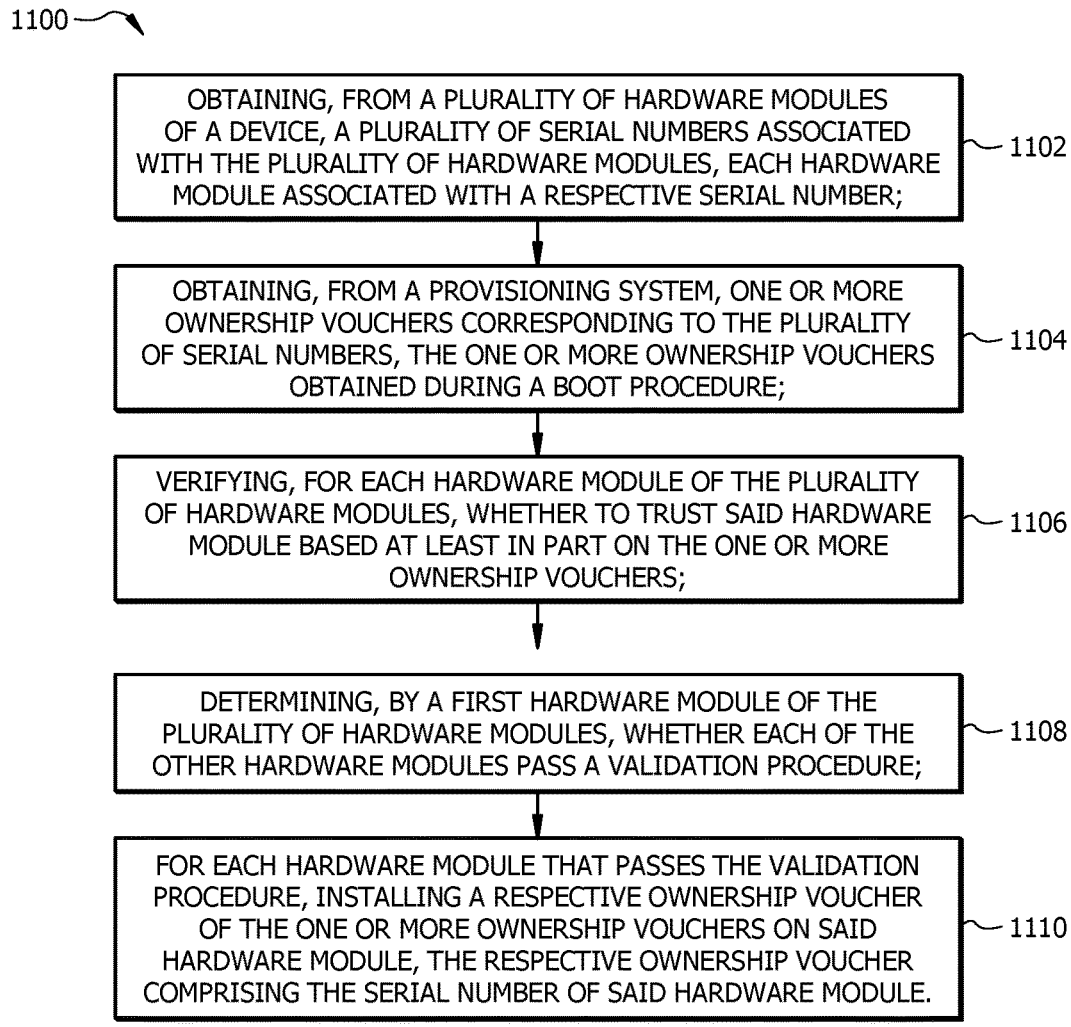
FIG. 10 illustrates an example directory structure with vouchers of both an active RP and a standby RP, in accordance with certain embodiments.
FIG. 11 illustrates an example of a method performed by a device, in accordance with certain embodiments.

FIG. 10 illustrates an example directory structure with vouchers of both an active RP and a standby RP, in accordance with certain embodiments. The directory structure may be used by device 102 and/or the provisioning system 106.

To summarize certain of the embodiments described above, the RFCs provide a way of establishing ownership of a single-RP device. Currently, for the case of a multi-RP device, the workflows defined in the RFCs only establish ownership for one RP (i.e., the active RP). Embodiments of the present disclosure provide solutions for establishing ownership of the standby RP during the bootstrapping process.

The present disclosure describes a number of options for establishing ownership. Examples include extending the OV to support multiple serial numbers, extending the payload of an RPC to include multiple OVs, sending multiple OVs via multiple messages, etc. The OVs facilitate establishing trust between a device 102 and an operator. Existing secure ZTP procedures defined by the RFCs do not currently establish trust for a device with multiple RPs in the same chassis (e.g., one active and one or more standby RPs). This disclosure is concerned with how to establish trust between the device 102 and the operator for each of the RPs in the chassis because establishing trust for only one RP is not sufficient to establish that all of the hardware plugged into the chassis can be trusted. Certain embodiments of the disclosure provide a way of determining whether to trust all the hardware plugged into the chassis. The steps include establishing trust within the chassis. For example, SUDI validation can be used between the active RP and the other hardware in the same chassis, such as the standby RP(s) and line card(s). The steps further include establishing trust between the chassis and the operator for all RPs (and, in some embodiments, for other types of hardware, such as line cards). For example, because the active RP validates the other hardware in the chassis, the active RP may communicate with the operator on behalf of all of the hardware in the chassis in order to establish trust with the operator.

As an example use case, a customer may plug a standby RP into the chassis of a device in the customer's possession. Establishing ownership of the standby RP allows the operator to trust that the customer has plugged in legitimate hardware from the manufacturer, as opposed to counterfeit hardware. To do this, the active RP uses the unique SUDI (private key-public key pair), which is anchored on a certificate with the serial number of the hardware. Certain embodiments perform SUDI verification/validation based on a challenge. The challenge asks the hardware to encrypt certain data and then verifies whether the hardware encrypted the data using the correct key (i.e., the key corresponding to legitimate hardware).

As an example, a chassis may include twenty cards (e.g., hardware modules 104). An RP may comprise main central processing unit (CPU) software. In certain embodiments, a first card may be an active RP and the other cards can be standby RPs and/or line cards with network processing units (NPUs). Only one of the RPs is active. The standby RP does not typically communicate with the line cards unless and until a switchover that causes the standby RP to become active and the active RP to become standby or otherwise non-active (e.g., if the previously active RP has failed). Each card may have an internal bus or an ethernet switch or domain that can communicate securely on an internal bus. When the customer powers on the chassis, either RP may come up as active. For example, the RP that comes up first can be set as active, and it is not known in advance which RP will come up first (it is random/varies depending on how long each RP happens to take to come up for a given power-on event). Each RP has a unique serial number. The network needs to have serial numbers of both RPs so it can communicate with the device 102 regardless of which RP comes up first. The problem with existing workflows in the RFCs is that you can only use one of the SUDIs when communicating with the network. The present disclosure provides solutions for making sure that both of the RPs are accepted by the operator. Thus, a customer can make sure that each of the RPs plugged into the chassis of device 102 correspond to RPs purchased by the customer and shipped an authorized party (e.g., manufacturer, reseller, distributor, etc.), not a third party counterfeiter.

In certain embodiments, device 102 performs steps to establish trust internally for all hardware (or all hardware of a particular type) within the device 102. For example, trust is established for all N of the RPs (active RP and one or more standby RPs). Then device 102 sends the operator serial numbers for all of the RPs to establish ownership. The internal validation within device 102 can comprise a SUDI challenge, for example, based on a cryptographic key pair exchange followed by a cryptographic challenge to ensure the public key is correct. The cryptographic challenge ask the other side to encrypt certain data and verifies whether the encrypted response is expected (if the data was encrypted with the correct key).

Certain embodiments identify the hardware on the bus even as it changes over time. Device 102 determines when hardware associated with a new serial number has been plugged into the chassis and performs the necessary verifications (e.g., SUDI validation and/or obtaining and installing OV).

Certain embodiments establish ownership at boot-time of device 102. For example, in an embodiment, an operator, such as Company X, operates the provisioning system 106 that does the provisioning for device 102. Company X may obtain ownership vouchers for the hardware modules 104 of device 102 from an authorized party. As an example, the authorized party may be Company Y, such as a company that designs, manufactures, and sells device 102 and/or trusted hardware modules 104 for device 102 to Company X. The ownership vouchers indicate that Company X owns the hardware modules 104 that Company X purchased from Company Y. The provisioning system 106 associated with Company X obtains the serial numbers of the hardware modules 104 running on device 102 from device 102 and sends device 102 the corresponding ownership vouchers based on matching the serial numbers received from device 102 to the serial numbers in the ownership vouchers obtained from Company Y. In this manner, trust is established for the hardware modules 104. The embodiments discussed above provide various options that allow for establishing ownership of multiple hardware modules 104.

Suppose one of the hardware modules 104 that has been verified is removed and replaced with a new hardware module 104. As an example, this can occur if a standby RP breaks and a new standby RP is plugged into the chassis in place of the broken standby RP. When the new standby RP is plugged in, the existing active RP may perform validation of the new standby RP. For example, internal validation within device 102 can be performed to verify that the new standby RP is valid (e.g., using a cryptographic challenge, which may be based on a SUDI of the new standby RP). Because ownership/trust for device 102 with respect to the operator associated with provisioning system 106 was previously established for device 102 at boot-time (e.g., via the active RP), the operator does not need to know about the new standby RP unless device 102 is power cycled, in which case the process of establishing ownership with the operator can be done at the next boot-time.

In certain embodiments, a first hardware module 104 (e.g., active RP) plugged into the chassis of a device 102 uses cryptographic challenges to verify each of the other hardware modules 104 plugged into the chassis. The device 102 then advertises the serial numbers for all of the hardware modules 104 to a provisioning system 106. In certain embodiments, the device 102 communicates with the provisioning system 106 via the first hardware module (e.g., active RP). As discussed above, certain embodiments establish ownership via a provisioning system 106 accessible via a network, such as a ZTP server. For example, protocol extensions or format changes can be implemented for RFC workflows so that device 102 and the ZTP server can provision multiple hardware components 104 during a boot procedure. Certain embodiments establish ownership via a provisioning system 106 comprising removeable storage, such as a USB drive. For example, files may be formatted and stored on the USB drive in a manner that facilitates provisioning multiple hardware components 104 during a boot procedure.

FIG. 11 illustrates an example of a method 1100 performed by a device 102, in accordance with certain embodiments. As discussed above, device 102 comprises a plurality of hardware modules 104. Examples of hardware modules 104 may include a first RP and a second RP, where the second RP is configured to be in a standby mode when the first RP is in an active mode, and vice versa. In certain embodiments, device 102 comprises one or more computer-readable non-transitory storage media comprising instructions that, when executed by processing circuitry of one or more of the hardware modules, cause the device to perform method 1100 of FIG. 11.

In certain embodiments, method 1100 begins at step 1102 with obtaining a plurality of serial numbers associated with the plurality of hardware modules 104. In certain embodiments, the plurality of hardware modules 104 may be of the same type. As an example, method 1100 may be performed for hardware modules 104 comprising a plurality of RPs (e.g., an RP configured as active and one or more RPs configured as standby). In certain embodiments, the plurality of hardware modules 104 may comprise different types of hardware modules 104. As an example, method 1100 may be performed for hardware modules 104 comprising one or more RPs and one or more line cards. Each hardware module 104 is associated with a respective serial number. For purposes of explanation, hardware module 104A may be associated with serial number 01, hardware module 104B may be associated with serial number 02, and so on. A serial number may comprises any suitable number of characters (e.g., numbers and/or letters), depending on the embodiment. A particular serial number may be unique to a particular hardware module 104. In certain embodiments, the plurality of serial numbers may be obtained by a first hardware module 104A of device 102, for example, as part of a boot procedure. For example, the first hardware module 104A (e.g., active RP) may obtain serial numbers from each of the other hardware modules 104 within device 102.

Method 1100 proceeds to step 1104 with obtaining one or more ownership vouchers. The one or more ownership vouchers are obtained by device 102 (e.g., via the active RP) from a provisioning system 106. In certain embodiments, provisioning system 106 comprises a ZTP server and the one or more ownership vouchers are obtained from the ZTP server via a network. In other embodiments, provisioning system 106 comprises removeable storage and the one or more ownership vouchers are obtained from the removeable storage via an interface of the device 102 configured to couple to the removable storage.

The one or more ownership obtained in step 1104 vouchers correspond to the plurality of serial numbers obtained in step 1102. In certain embodiments, method 1100 obtains the one or more ownership vouchers during a boot procedure. As an example, certain embodiments obtain the one or more ownership vouchers for the plurality of hardware modules 104 during a single boot procedure when device 102 powers on. In this manner, ownership may be established efficiently for each hardware module 104 (e.g., without requiring a customer to manually establish ownership for the plurality of hardware modules 104 after the boot procedure).

In certain embodiments, multiple serial numbers for multiple hardware modules for 104 are include in the same ownership voucher. For example, the one or more ownership vouchers obtained in step 1104 comprise at least a first ownership voucher, and the first ownership voucher comprises multiple serial numbers of the plurality of serial numbers (such as serial number 01 associated with hardware module 104A, serial number 02 associated with hardware module 104B, and so on). Examples of including multiple serial numbers in the same ownership voucher are further described above with respect to Embodiment 1 (Option A) and Embodiment 2 (Option A).

In certain embodiments, multiple ownership vouchers are obtained in step 1104 The number of ownership vouchers obtained in step 1104 may be two, three, four, or more (e.g., many) ownership vouchers, for example, depending on a number of hardware modules 104 installed in device 102 and requiring validation. For purposes of example and explanation, the one or more ownership vouchers comprise at least a first ownership voucher and a second ownership voucher, the first ownership voucher comprising a first serial number of the plurality of serial numbers (such as serial number 01 associated with hardware module 104A) and the second ownership voucher comprising a second serial number of the plurality of serial numbers (such as serial number 02 associated with hardware module 104B). As a first example, in certain embodiments, the first ownership voucher and the second ownership voucher may both be obtained in response to sending the provisioning system 106 a request for bootstrapping data, such as the get-bootstrapping-data request described above with respect to Embodiment 1, Option B. As a second example, in certain embodiments, the first ownership voucher may be obtained in response to sending the provisioning system 106 a request for bootstrapping data (such as the get-bootstrapping-data request described above with respect to Embodiment 1, Option C) and the second ownership voucher may be obtained in response to sending the provisioning system 106 a separate request (such as the get-ownership-voucher request described above with respect to Embodiment 1, Option C). As a third example, in certain embodiments, the first ownership voucher and the second ownership voucher are read from one or more directories of a removeable storage device that implements provisioning system 106, such as described above with respect to Embodiment 2, Option B.

Method 1100 may proceed to step 1106 with verifying, for each hardware module 104 of the plurality of hardware modules 104, whether to trust said hardware module 104 based at least in part on the one or more ownership vouchers. For example, step 1106 may verify whether to trust hardware module 104A based on the ownership voucher comprising serial number 01 (i.e., hardware module 104A's serial number). Step 1106 may verify whether to trust hardware module 104B based on the ownership voucher comprising serial number 02 (i.e., hardware module 104B's serial number). As described above, the same ownership voucher may contain both serial numbers, or separate ownership vouchers may be provided for each serial number, depending on the embodiment.

In certain embodiments, an ownership voucher indicates an owner of the respective hardware module 104 as it is known to an authorized party (e.g., manufacturer, reseller, distributor, etc.). For example, if a manufacturer (e.g., Company Y) sells the hardware module 104 to a customer (e.g., Company X), the ownership voucher indicates Company X as the owner of the hardware module 104. Establishing trust in step 1106 may indicate that hardware module 104 has been plugged into a device 102 associated with Company X, for example, by verifying that an owner certificate associated with device 102 has a chain of trust leading to a trusted certificate included in the ownership voucher.

In certain embodiments, method 1100 may further comprise step 1108, where a first hardware module 104A (e.g., active RP) of the plurality of hardware modules 104 verifies whether each of the other hardware modules 104 passes a validation procedure. In this manner, the method 1100 may perform a validation procedure internally within device 102. Examples of a validation procedure are described above, for example, with respect to Embodiment 1 (Option D) and Embodiment 2 (Option C). In certain embodiments, the validation procedure may comprise a cryptographic challenge. In certain embodiments, the cryptographic challenge may be based on a SUDI of the hardware module 104 being validated. Other embodiments may use other techniques, such as a Diffie-Hellman key exchange. For each hardware module 104 that passes the validation procedure of step 1108, the method may proceed to step 1110 with installing a respective ownership voucher of the one or more ownership vouchers on said hardware module 104. The respective ownership voucher comprises the serial number of said hardware module 104. As an example, the ownership voucher comprising serial number 02 would be installed on hardware module 104B because serial number 02 corresponds to hardware module 104B.

Optionally, certain embodiments of method 1100 further comprise detecting a new hardware module 104. The hardware module 104 may be considered new in the sense that it is added to the device 102 after the boot procedure. Method 1100 may further comprise determining whether the new hardware module 104 passes a validation procedure. In certain embodiments, the validation procedure comprise a cryptographic challenge. As an example, the cryptographic challenge may be based on a SUDI of the new hardware module 104. Other embodiments may use other techniques, such as a Diffie-Hellman key exchange. Method 1100 may then determine a type of action to perform based on whether the new hardware module 104 passes the validation procedure. As an example, if the new hardware module 104 passes the validation procedure, the action may comprise allowing the new hardware module 104 to run within device 102. As another example, if the new hardware module 104 fails the validation procedure, the action may comprise blocking the new hardware module 104 from running within device 102 and/or identifying the new hardware module 104 as counterfeit (e.g., in a system log and/or in a message communicated via a network, etc.). Method 1100 then performs the applicable action (i.e., the action determined based on whether the hardware module 104 passed the validation procedure). Certain embodiments rely on internally validating the new hardware module 104 within device 102 (e.g., without obtaining an ownership voucher from the provisioning system 106) when the new hardware module 104 is added after a boot procedure. If device 102 later performs a second boot procedure (e.g., based on powering device 102 off and then back on), an ownership voucher may be obtained for the new hardware module 104 at that time.

Certain embodiments may further include a step of verifying that each hardware module 104 is anchored to a bus of the device 102. For example, this verification step may be performed prior to step 1102 such that step 1102 and the steps that follow need only be performed for hardware modules 104 anchored to the bus. Verifying that each hardware module 104 is anchored to the bus may help to ensure that there correct hardware module 104 is being verified (e.g., to ensure that there is no man-in-the-middle (MITM) trying to establish trust for counterfeit hardware modules 104).

Although certain embodiments discussed above describe an example of a device 102 comprising a plurality of hardware modules 104 as being implemented using a chassis and a system of cards (e.g., wherein a card is an example of hardware module 104), other implementations are possible. As an example, device 102 may be implemented as a constellation of fixed systems that together form one larger system. In this context, one or more of the hardware modules 104 may correspond to component systems of the larger system. Thus, in certain embodiments, device 102 may comprise a distributed chassis composed of multiple separate systems (which may be made up of multiple chassis or pizza box-style computing equipment, for example).

Figure 12:
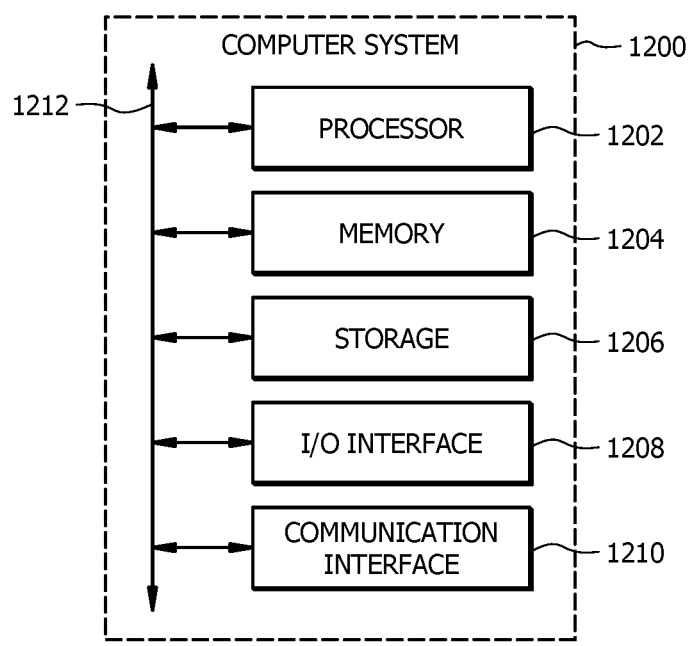
FIG. 12 illustrates an example of a computer system, in accordance with certain embodiments.

Reference is now made to FIG. 12, wherein is shown an example computer system 1200 which may be used by the systems and methods described herein. In particular embodiments, one or more computer systems 1200 provide functionality described or illustrated herein. As an example, one or more computer systems 1200 may be used to implement a device 102, a hardware module 104, or a provisioning system 106 described with respect to FIG. 1. As another example, one or more computer systems 1200 may be used to perform one or more steps of the sequences described with respect to FIGS. 5, 7A, 7B, 8A, 8B, 9, and/or 11. In particular embodiments, software running on one or more computer systems 1200 provides functionality described or illustrated herein or performs one or more steps of one or more methods described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example, and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method performed by a device, the method comprising:
    obtaining, from a plurality of hardware modules of the device, a plurality of serial numbers associated with the plurality of hardware modules, each hardware module associated with a respective serial number;
    obtaining, from a provisioning system, one or more ownership vouchers corresponding to the plurality of serial numbers;
    verifying, for each hardware module of the plurality of hardware modules, whether to trust said hardware module based at least in part on the one or more ownership vouchers; and
    verifying that each of the plurality of hardware modules is anchored to a bus of the device.

2. The method of claim 1, wherein the one or more ownership vouchers comprise at least a first ownership voucher, the first ownership voucher comprising multiple serial numbers of the plurality of serial numbers.

3. The method of claim 1, wherein the one or more ownership vouchers comprise at least a first ownership voucher and a second ownership voucher, the first ownership voucher comprising a first serial number of the plurality of serial numbers and the second ownership voucher comprising a second serial number of the plurality of serial numbers.

4. A device, the device comprising:
a plurality of hardware modules; and
one or more computer-readable non-transitory storage media comprising instructions that, when executed by processing circuitry of one or more of the plurality of hardware modules, cause the device to perform operations comprising:
obtaining, from the plurality of hardware modules, a plurality of serial numbers associated with the plurality of hardware modules, each hardware module associated with a respective serial number;
obtaining, from a provisioning system, one or more ownership vouchers corresponding to the plurality of serial numbers;
verifying, for each hardware module of the plurality of hardware modules, whether to trust said hardware module based at least in part on the one or more ownership vouchers; and
verifying that each of the plurality of hardware modules is anchored to a bus of the device.

5. The device of claim 4, wherein the one or more ownership vouchers comprise at least a first ownership voucher, the first ownership voucher comprising multiple serial numbers of the plurality of serial numbers.

6. The device of claim 4, wherein the one or more ownership vouchers comprise at least a first ownership voucher and a second ownership voucher, the first ownership voucher comprising a first serial number of the plurality of serial numbers and the second ownership voucher comprising a second serial number of the plurality of serial numbers.

7. The device of claim 6, wherein the first ownership voucher and the second ownership voucher are obtained in response to sending the provisioning system a request for bootstrapping data.

8. The device of claim 6, wherein the first ownership voucher is obtained in response to sending the provisioning system a request for bootstrapping data and the second ownership voucher is obtained in response to sending the provisioning system a separate request.

9. The device of claim 6, wherein the first ownership voucher and the second ownership voucher are obtained based on reading from one or more directories of a removeable storage device.

10. The device of claim 4, wherein the operations further comprise:
determining, by a first hardware module of the plurality of hardware modules, whether each of the other hardware modules pass a validation procedure; and
for each hardware module that passes the validation procedure, installing a respective ownership voucher of the one or more ownership vouchers on said hardware module, the respective ownership voucher comprising the serial number of said hardware module.

11. The device of claim 10, wherein the validation procedure comprises a cryptographic challenge.

12. The device of claim 4, wherein the operations further comprise:
detecting a new hardware module added to the device;
determining whether the new hardware module passes a validation procedure;
determining a type of action to perform based on whether the new hardware module passes the validation procedure; and
performing the action.

13. The device of claim 4, wherein the plurality of hardware modules comprise a first route processor and a second route processor, the second route processor configured to be in a standby mode when the first route processor is in an active mode.

14. The device of claim 4, wherein the provisioning system comprises a zero touch provisioning (ZTP) server and the one or more ownership vouchers are obtained from the ZTP server via a network.

15. The device of claim 4, wherein the provisioning system comprises removeable storage and the one or more ownership vouchers are obtained from the removeable storage via an interface of the device configured to couple to the removable storage.

16. One or more computer-readable non-transitory storage media embodying instructions that, when executed by a processor of a device, cause the performance of operations comprising:
obtaining, from a plurality of hardware modules of the device, a plurality of serial numbers associated with the plurality of hardware modules, each hardware module associated with a respective serial number;
obtaining, from a provisioning system, one or more ownership vouchers corresponding to the plurality of serial numbers;
verifying, for each hardware module of the plurality of hardware modules, whether to trust said hardware module based at least in part on the one or more ownership vouchers; and
verifying that each of the plurality of hardware modules is anchored to a bus of the device.

17. The one or more computer-readable non-transitory storage media of claim 16, wherein the one or more ownership vouchers comprise at least a first ownership voucher, the first ownership voucher comprising multiple serial numbers of the plurality of serial numbers.

18. The one or more computer-readable non-transitory storage media of claim 16, wherein the one or more ownership vouchers comprise at least a first ownership voucher and a second ownership voucher, the first ownership voucher comprising a first serial number of the plurality of serial numbers and the second ownership voucher comprising a second serial number of the plurality of serial numbers.

19. The one or more computer-readable non-transitory storage media of claim 16, wherein the operations further comprise:
determining, by a first hardware module of the plurality of hardware modules, whether each of the other hardware modules pass a validation procedure; and
for each hardware module that passes the validation procedure, installing a respective ownership voucher of the one or more ownership vouchers on said hardware module, the respective ownership voucher comprising the serial number of said hardware module.

* * * * *